(12) United States Patent
Min et al.

(10) Patent No.: US 8,446,689 B2
(45) Date of Patent: May 21, 2013

(54) HIGH DATA RATE MAGNETIC WRITER DESIGN

(75) Inventors: Tai Min, San Jose, CA (US); Lijie Guan, Milpitas, CA (US); Min Li, Fremont, CA (US); Jiun-Ting Lee, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/136,182

(22) Filed: Jul. 26, 2011

(65) Prior Publication Data

US 2013/0027809 A1    Jan. 31, 2013

(51) Int. Cl.
*G11B 5/127*    (2006.01)
(52) U.S. Cl.
USPC .......................................................... 360/122
(58) Field of Classification Search
USPC .......................................................... 360/122
See application file for complete search history.

(56) References Cited

U.S. PATENT DOCUMENTS

| | | | | |
|---|---|---|---|---|
| 5,864,450 A | * | 1/1999 | Chen et al. | 360/319 |
| 6,163,442 A | * | 12/2000 | Gill et al. | 360/317 |
| 6,317,290 B1 | * | 11/2001 | Wang et al. | 360/125.56 |
| 6,477,765 B1 | * | 11/2002 | Herrera | 29/603.14 |
| 6,525,902 B1 | * | 2/2003 | Hu et al. | 360/125.42 |
| 7,212,379 B2 | * | 5/2007 | Hsu et al. | 360/125.16 |
| 7,595,959 B2 | * | 9/2009 | Covington et al. | 360/125.02 |
| 2007/0171575 A1 | | 7/2007 | Lim et al. | |
| 2009/0197119 A1 | | 8/2009 | Kong et al. | |

OTHER PUBLICATIONS

"Control of Magnetization Dynamics in Ni81Fe19 Thin Films Through the Use of Rare-Earth Dopants," by William Bailey et al., IEEE Transactions on Magnetics, vol. 37, No. 4, Jul. 2001, pp. 1749-1754.

"Effect of 3d, 4d, and 5d transition metal doping on damping in permalloy thin films," by J. O. Rantschler et al., Journal of Applied Physics 101, 033911 (2007), pp. 1-5.

* cited by examiner

*Primary Examiner* — Mark Blouin
(74) *Attorney, Agent, or Firm* — Saile Ackerman LLC; Stephen B. Ackerman

(57) ABSTRACT

A high speed magnetic data writer containing a stitched pole tip that works in conjunction with the main pole is disclosed, together with a process for their manufacture. The material composition of each of these two sub-structures is slightly different; one sub-structure is optimized for high magnetic damping while the other sub-structure is optimized for high saturation magnetization.

23 Claims, 4 Drawing Sheets

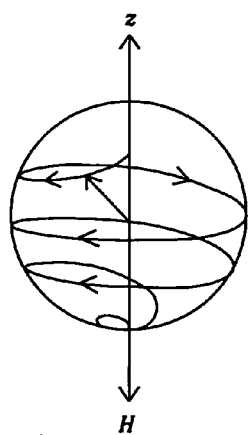 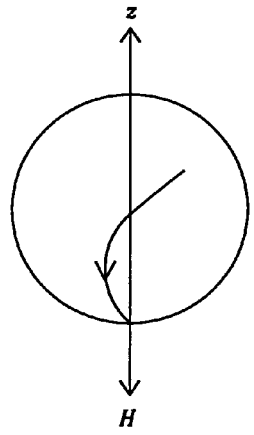
FIG. 1a    FIG. 1b
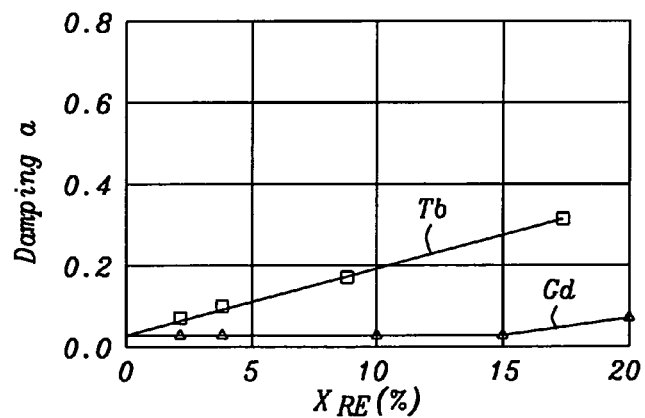
FIG. 2
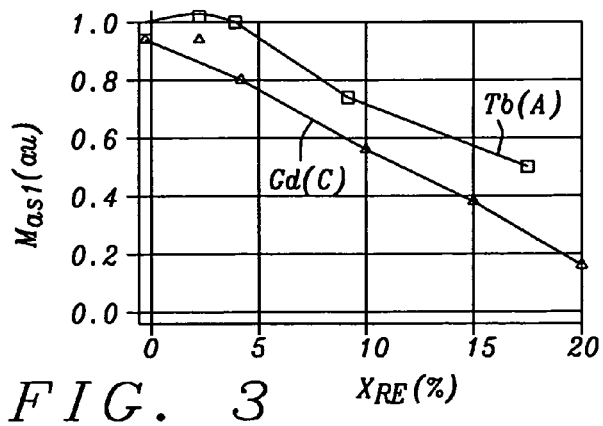
FIG. 3

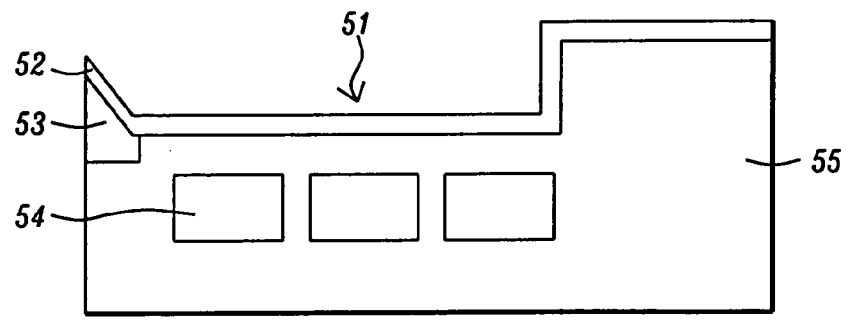
FIG. 4
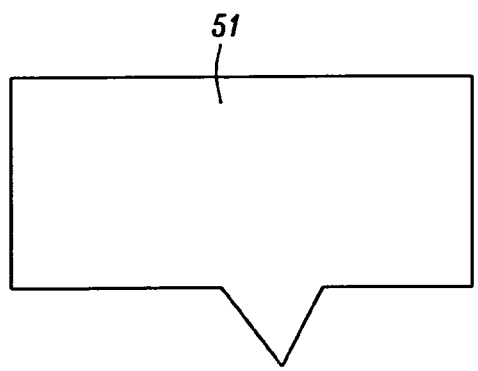
FIG. 5a
FIG. 5b

HIGH DATA RATE MAGNETIC WRITER DESIGN

FIELD OF THE INVENTION

The invention relates to recording data on magnetic disks, with particular reference to the design and manufacture of devices capable of recording at rates in the gigabits per second range.

BACKGROUND OF THE INVENTION

For today's high density magnetic recording, the recorded bits per inch (BPI) and the data rate for writing have both either already entered, or are rapidly approaching, the Giga range. It is essential that this increase in the data rate capability of writers not be accompanied by an increase in the bit error rate (BER).

To enhance the data rate of a writer, its frequency response to the writing current has to be improved. During the writing process, magnetization will follow the Landau-Lifshitz-Gilbert equation:

$$\frac{dM}{dt} = -\gamma M \times H_{\mathit{eff}} + \frac{\alpha}{M} M \times \frac{dM}{dt}$$

where M is the magnetization, $\gamma$ is the gyromagnetic coefficient, Heff is the field, including the applied field, the demagnetization field, and the anisotropic field. $\alpha$ is the Gilbert damping constant. The $1^{st}$ term is the gyro motion of magnetization around the direction of Heff while the $2^{nd}$ term is the damping term which will dissipate the energy of M motion and align the M along the direction of Heff.

The value of $\alpha$ determines how fast M aligns with Heff, as illustrated schematically by the two examples shown in FIGS. 1a and 1b. In FIG. 1a $\alpha$ is relatively small while in FIG. 1b $\alpha$ is relatively large. This damping process is a major factor in determining the magnetic material's response time to the writing field. The damping constants of the high saturation magnetization (Ms) materials used in present day writers (Fe, Co, Ni alloys) is small, being in the range of from 0.002 to 0.02.

Another issue facing today's high density writers is the accidental erasure of data due to the remnant magnetization of the write pole. To eliminate this problem, magnetic materials with good soft properties (small anisotropy field Hk) are needed. However, not all soft magnetic materials have an Ms value that is large enough to provide a high intensity writing field.

REFERENCES

[1] W. Bailey et. al. IEEE Magn. 37, pp 1749, 2001
[2] J. Rantschler, et. al. JAP. 101, pp 033911, 2007
A routine search of the prior art was performed with the following references of interest being found:

U.S. Pat. No. 7,595,959 (Covington et al) teaches that damping may be increased by doping with rare earth or transition elements. Dopants include Os, Ir, and Pt. In U.S. Patent Application 2007/0171575, Lim et al. teach a damping control layer formed by doping rare earth or transition metals such as Os, Ru, Pt on the soft magnetic underlayer while Kong et al., in U.S. Patent Application 2009/0197119, disclose a soft magnetic layer having a low anisotropic field.

SUMMARY OF THE INVENTION

It has been an object of at least one embodiment of the present invention to describe a high data rate magnetic writer Another object of at least one embodiment of the present invention has been to present a process for the manufacture of said high data rate magnetic writer.

Still another object of at least one embodiment of the present invention has been to describe the composition of several key sub-structures within said high data rate magnetic writer.

These objects have been achieved by utilizing magnetic materials with high damping constant as part or all of the writer's magnetic sub-structure. These materials are high moment Co, Fe, Ni alloys doped with a small percentage of rare earth and/or 3d-5d transition metals that will increase the damping constant significantly.

An important feature of the invention is the provision of a stitched pole tip that works in conjunction with the main pole. The material composition of each of these two sub-structures is slightly different; one sub-structure is optimized for high magnetic damping while the other sub-structure is optimized for high saturation magnetization. This arrangement results in a device having both a high damping constant as well as a high saturation magnetization.

BRIEF DESCRIPTION OF THE DRAWINGS

FIG. 1 compares magnetization motions for low (1a) and high (1b) values of the damping constant.

FIG. 2 damping constant as a function of atomic percentage of the Rare Earth dopants Tb and Gd for a NiFe thin film (Ref. 1)

FIG. 3 Ms value as a function of Rare Earth element dopants Tb and Gd for a NiFe FIG. 4 damping constant as a function of atomic percentage of 3d-5d elements in a NiFe thin film (Ref. 2)

FIGS. 5a-9 Process steps for manufacturing the stitched main pole design

DESCRIPTION OF THE PREFERRED EMBODIMENTS

Figure 6:
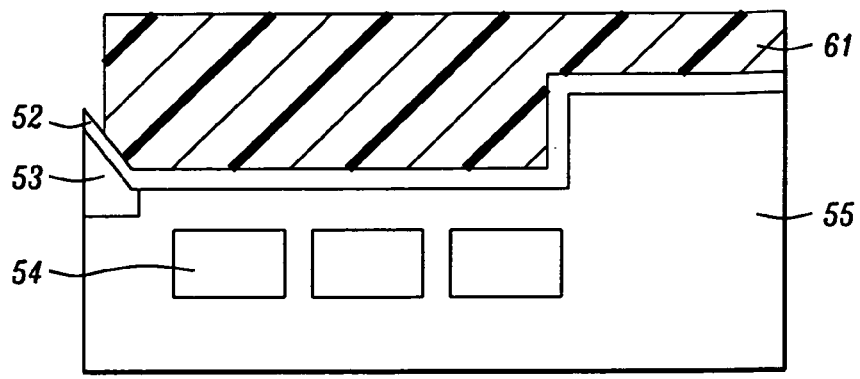

As illustrated in FIG. 2, the damping constant increases from a value of less than 0.1 to a value of 0.3 as the concentration of Tb dopant increases from 2% to about 17.5%. However, as shown by FIG. 3, although Ms, the saturation magnetization of the material, is essentially unchanged for Tb concentrations up to about 4%, Ms has been reduced by about 50% by the time the Tb concentration reaches about 17.5%. Thus a small amount of Tb doping will enhance the damping constant significantly without decreasing the saturation magnetization but, if further increases in $\alpha$ are to be achieved, the price is a correspondingly lower value of Ms.

Note that the damping constant can also be increased by doping with a 3d-5d transition metal, as shown in FIG. 4, where the damping constant $\alpha_z$, at a doping concentration of x atomic %, was calculated from the following formula:

$$\alpha_z = \alpha_0 + \beta_z x.$$

where
$\alpha_0 = (8.0 \pm 0.5) \times 10^{-3}$.
$\beta_z$ values for various 3d-5d metals are as listed in FIG. 4 where they are displayed in histogram format.

The present invention discloses a writer design in which both high Ms and high $\alpha$ are achieved in the same unit.

Referring now to FIG. 5a, we show there the starting point for the manufacture of a first embodiment of the invention.

This initial structure includes lower field coil 54 that has been embedded within non-magnetic dielectric 55. Cavity 51 has been formed in the top surface of 55 and its internal walls have been coated with layer 52 suitable for use as the write gap portion of the final structure. Note that one of these internal walls is not vertically oriented relative to the floor of cavity 51 but, rather, slopes upwards at an angle of about 30 degrees relative to, and away from, the floor. Note, too, the presence of leading shield 53 located between layer 55 and the underside of layer 52.

FIG. 5b is a bird's eye view of FIG. 5a from a point located a short distance above 5a.

Next, as illustrated in FIG. 6, photoresist layer 61 is laid down and patterned to form a mask that covers all of layer 52 except about half the sloping portion of 52 that was described above. Next, in a key feature of the invention shown in FIG. 7, layer 71 is electrodeposited on the exposed portion of gap layer 52. Although not shown, in practice, prior to initiating electroplating, a seed layer of conductive material is deposited (usually by sputtering) over the entire structure. Once layer 71 has reached the desired thickness (generally in a range of from 0.1 to 1 microns), electro-deposition is terminated and photoresist layer 61 is fully removed (as illustrated in FIG. 8) thereby recreating cavity 51 seen earlier.

The material used for layer 71, in addition to being suitable for the formation of the pole tip, is characterized by possessing a high value of Ms (4 $\pi$Ms) (generally in a range of from 20 k to 24.5 k Oe, with a range of from 24.3 k to 24.5 k Oe being preferred), while the value of $\alpha$ in layer 71 is required to be at least 0.02. To achieve these properties, the composition of layer 71 was typically Fe30% Co70%.

Figure 9:
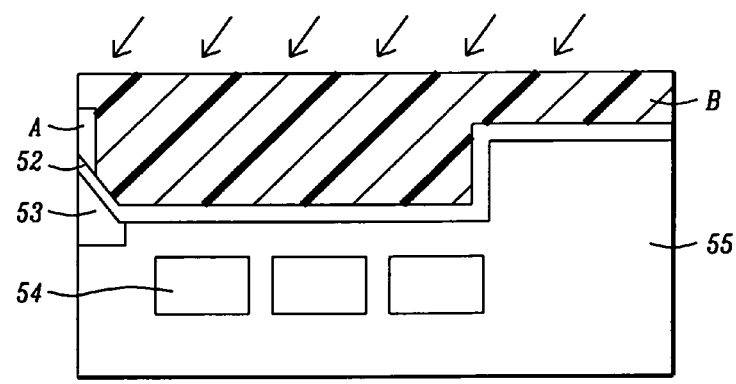

Turning next to FIG. 9, cavity 51 is first over-filled with material that, in addition to being suitable for the formation of the main pole, is characterized by possessing a high value of $\alpha$ (generally in a range of from 0.05 to 0.5, with a range of from 0.1 to 0.2 being preferred), while the value of Ms (4 $\pi$Ms) in layer 71 is required to be at least 19 k Oe. To achieve these properties, the composition of this layer was typically [Fe30% Co70%]$_{1-x}$Tb$_x$ where x ranges from 0.01 to about 0.2.

Note that, from FIG. 9 on, the pole tip (formerly designated as layer 71) has been given the designation of region A while the main pole (filling former cavity 51) is now designated as region B.

Figures 10A, 10B:
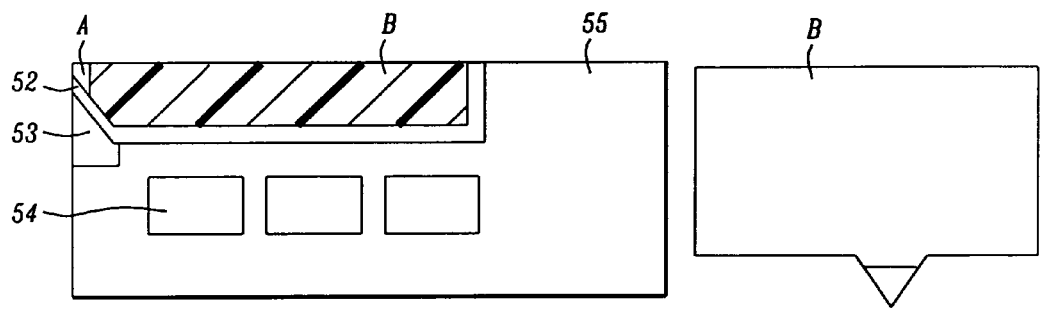
FIGS. 10a and 10b Cross-sectional and bird's eye views, respectively, of a first embodiment of the invention.

As illustrated in FIG. 10a, the structure is then planarized (typically through use of CMP) until the top surface of region A is exposed and the thickness of region A extends upwards from write gap 52 by an amount that is in a range of from 0.1 to 1.0 microns. FIG. 10b is a bird's eye view looking down at region B (main pole) and showing the latter's relationship to region B (a stitched pole tip).

The remaining parts of the device, including the top and write yokes and the upper field coil, are formed in the usual manner, thereby completing fabrication of the device. Provided the materials specified above were used, this device is able to record magnetic data at a rate of at least 1 GHz.

ADDITIONAL EMBODIMENTS OF THE INVENTION

Figure 11:
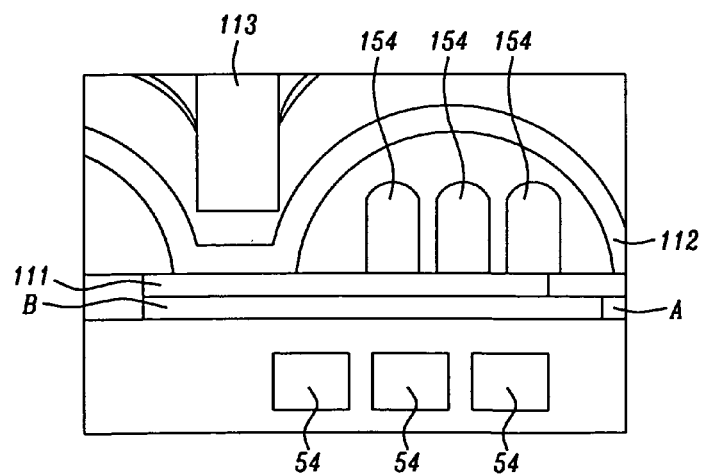
FIG. 11 Cross-sectional view of the full writer structure

In a second embodiment, the high-$\alpha$ material is used in other parts of the writer as well. The yoke for example. This is illustrated in FIG. 11 where only top yoke 111 is explicitly shown. However, the top and/or the bottom (B) sections of the yoke could also have been formed in the same way (i.e. with high-$\alpha$ material). Also shown in FIG. 11 are upper field coils 154 and background material 113 (such as Al$_2$O$_3$).

Figure 7:
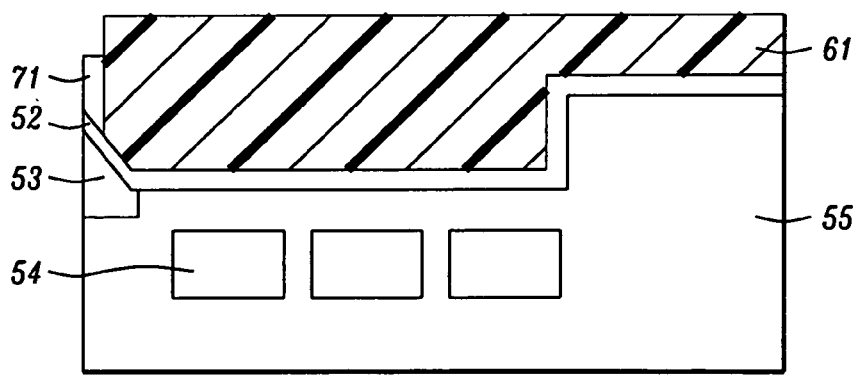
Figure 8:
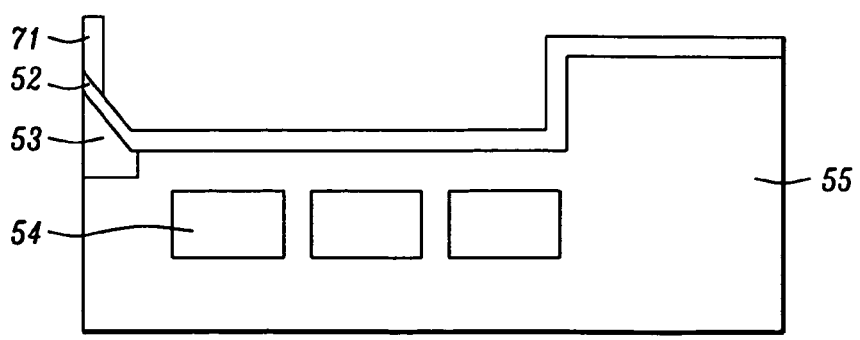

In a third embodiment, high-$\alpha$ material is used for some or all of the remaining parts of the writer structure, as shown in FIG. 7.

What is claimed is

1. A process for manufacturing a magnetic writer having a high data rate, comprising:

providing a lower field coil embedded within a non-magnetic dielectric layer having a first top surface;

forming in said first top surface a cavity having internal walls, one of said internal walls being a sloping wall that subtends an angle of about 30 degrees relative to said first top surface;

depositing a write gap layer on said internal walls;

then forming a mask that covers all of said write gap layer except an upper portion of said sloping wall;

then electrodepositing a magnetic pole tip layer on said upper portion of said sloping wall, said magnetic pole tip layer having a saturation magnetization in a range of from 20 k to 24.5 k Oe and a magnetic damping constant of 0.05 to 0.5;

once said magnetic pole tip layer has reached a thickness in a range of from 0.1 to 0.5 microns, terminating electrodeposition and then removing all of said mask;

then over-filling said cavity with a material that is suitable for a main pole, that has a magnetic damping constant in a range of from 0.05 to 0.5, and that has a saturation magnetization of 19k to 24.5k, thereby forming a main pole;

then planarizing until a second top surface of said magnetic pole tip layer is exposed, said second top surface being coplanar with a third top surface of said main pole, thereby forming a stitched pole tip that extends upwards from said write gap layer by an amount that is in a range of from 0.1 to 1 microns; and forming, on said second top surface, a top yoke, a write yoke, and an upper field coil.

2. The process recited in claim 1 wherein said magnetic writer is able to record magnetic data at a rate of at least $10^9$ bits per second.

3. The process recited in claim 1 wherein said magnetic pole tip layer has a saturation magnetization in a range of from 19 k to 24 k Gauss and is an alloy of Fe, Co, and Ni, doped with one or more elements selected from the group consisting of all rare earth elements, present in said alloy in concentrations of up to 10 atomic percent.

4. The process recited in claim 1 wherein said main pole has a magnetic damping constant in a range of from 0.1 to 0.5 and is an alloy of Fe, Co and Ni, doped with one or more elements selected from the group consisting of all rare earth elements that are present in said alloy in concentrations of up to 10 atomic percent.

5. The process recited in claim 1 wherein said top yoke has a magnetic damping constant in a range of from 0.1 to 0.5.

6. The process recited in claim 1 wherein said write yoke has a magnetic damping constant in a range of from 0.1 to 0.5.

7. A process for manufacturing a magnetic writer having a high data rate, comprising:

providing a lower field coil embedded within a non-magnetic dielectric layer having a first top surface;

forming in said first top surface a cavity having internal walls, one of said internal walls being a sloping wall that subtends an angle of about 45 degrees relative to said first top surface;

depositing a write gap layer on said internal walls;

then forming a mask that covers all of said write gap layer except an upper portion of said sloping wall;

then electrodepositing a magnetic pole tip layer on said upper portion of said sloping wall, said magnetic pole tip layer having a magnetic damping constant in a range of from 0.002 to 0.1 and a saturation magnetization of 23 to 24.5 kG;

once said magnetic pole tip layer has reached a thickness in a range of from 0.05 to 0.5, terminating electrodeposition and then removing all of said mask;

then over-filling said cavity with a material that is suitable for a main pole, that has a saturation magnetization in a range of from 19 to 24 kG and a magnetic damping constant of 0.05 to 0.5, thereby forming a main pole;

then planarizing until a second top surface of said magnetic pole tip layer is exposed, said second top surface being coplanar with a third top surface of said main pole, thereby forming a stitched pole tip that extends upwards from said write gap layer by an amount that is in a range of from 0.1 to 1 microns; and forming, on said second top surface, a top yoke, a write yoke, and an upper field coil.

8. The process recited in claim 7 wherein said magnetic writer is able to record magnetic data at a rate of at least $10^9$ bits per second.

9. The process recited in claim 7 wherein said magnetic pole tip layer has a magnetic damping constant in a range of from 0.1 to 0.5 and is an alloy of Fe, Co, and Ni.

10. The process recited in claim 7 wherein said main pole has a saturation magnetization in a range of from 19 to 24 kG and is an alloy of Fe, Co, and Ni doped with one or more elements selected from the group consisting of all rare earth elements that are present in said alloy in concentrations of up to 10 atomic percent.

11. The process recited in claim 7 wherein said top yoke has a magnetic damping constant in a range of from 0.1 to 0.5.

12. The process recited in claim 7 wherein said write yoke has a magnetic damping constant in a range of from 0.1 to 0.5.

13. A magnetic writer, having a high data rate and an air bearing surface (ABS), comprising:
a lower field coil embedded within a non-magnetic dielectric layer having a first top surface;
embedded within said non-magnetic dielectric layer and extending downward from said first top surface, a volume of main pole material having interfacial walls, one of said interfacial walls being a sloping wall that subtends an angle of about 30 degrees relative to said first top surface;
a write gap layer between said main pole material and said non-magnetic dielectric layer, said main pole material having a magnetic damping constant in a range of from 0.002 to 0.1, and a saturation magnetization of 23 to 24.5 kG;
a magnetic pole tip located over an upper portion of said sloping wall and extending upward within said volume from said write gap layer to said first surface, whereby said magnetic pole tip is a stitched pole located a distance between said main pole and said ABS;
said magnetic pole tip having a saturation magnetization in a range of from 19 to 24 kG and a magnetic damping constant of 0.05 to 0.5;
a top yoke on said second top surface; and
a write yoke and an upper field coil over said top yoke.

14. The magnetic writer described in claim 13 wherein said distance between said main pole and said ABS is in a range of 0.1 to 0.5 microns.

15. The magnetic writer described in claim 13 wherein said magnetic writer is able to record magnetic data at a rate of at least $10^9$ bits per second.

16. The magnetic writer described in claim 13 wherein said magnetic pole tip layer has a saturation magnetization in a range of from 19 k to 24 k Gauss and is an alloy of Fe, Co, and Ni, doped with one or more elements selected from the group consisting of all rare earth elements, present in said alloy in concentrations of up to 10 atomic percent.

17. A magnetic writer, having a high data rate and an air bearing surface (ABS), comprising:
a lower field coil embedded within a non-magnetic dielectric layer having a first top surface;
embedded within said non-magnetic dielectric layer and extending downward from said first top surface, a volume of main pole material having interfacial walls, one of said interfacial walls being a sloping wall that subtends an angle of about 30 degrees relative to said first top surface;
a write gap layer between said main pole material and said non-magnetic dielectric layer, said main pole material having a saturation magnetization in a range of from 19 k to 24$k$ Oe and a magnetic damping constant of 0.05 to 0.5;
a magnetic pole tip located over an upper portion of said sloping wall and extending upward within said volume from said write gap layer to said first surface, whereby said magnetic pole tip is a stitched pole located a distance between said main pole and said ABS;
said magnetic pole tip having a magnetic damping constant in a range of from 0.002 to 0.1, and a saturation magnetization of 23 to 24.5 kG;
a top yoke on said second top surface; and
a write yoke and an upper field coil over said top yoke.

18. The magnetic writer described in claim 17 wherein said distance between said main pole and said ABS is in a range of 0.1 to 0.5 microns.

19. The magnetic writer described in claim 17 wherein said magnetic writer is able to record magnetic data at a rate of at least $10^9$ bits per second.

20. The magnetic writer described in claim 17 wherein said magnetic pole tip layer has a magnetic damping constant in a range of from 19 k to 24 k Gauss and is an alloy of Fe, Co, and Ni, doped with one or more elements selected from the group consisting of all rare earth elements, present in said alloy in concentrations of up to 10 atomic percent.

21. The magnetic writer recited in claim 17 wherein said main pole has a saturation magnetization in a range of from 19 k to 24$k$ Gauss and is an alloy of Fe, Co, and Ni, doped with one or more elements selected from the group consisting of all rare earth elements, present in said alloy in concentrations of up to 10 atomic percent.

22. The magnetic writer described in claim 17 wherein said top yoke has a magnetic damping constant in a range of from 0.1 to 0.5.

23. The magnetic writer described in claim 17 wherein said write yoke has a magnetic damping constant in a range of from 0.1 to 0.5.

* * * * *